March 31. 1925.
C. F. BULLOCK
1,532,035
FLOW NOZZLE FOR USE WITH FLOW METERS AND THE LIKE
Filed Aug. 22, 1923
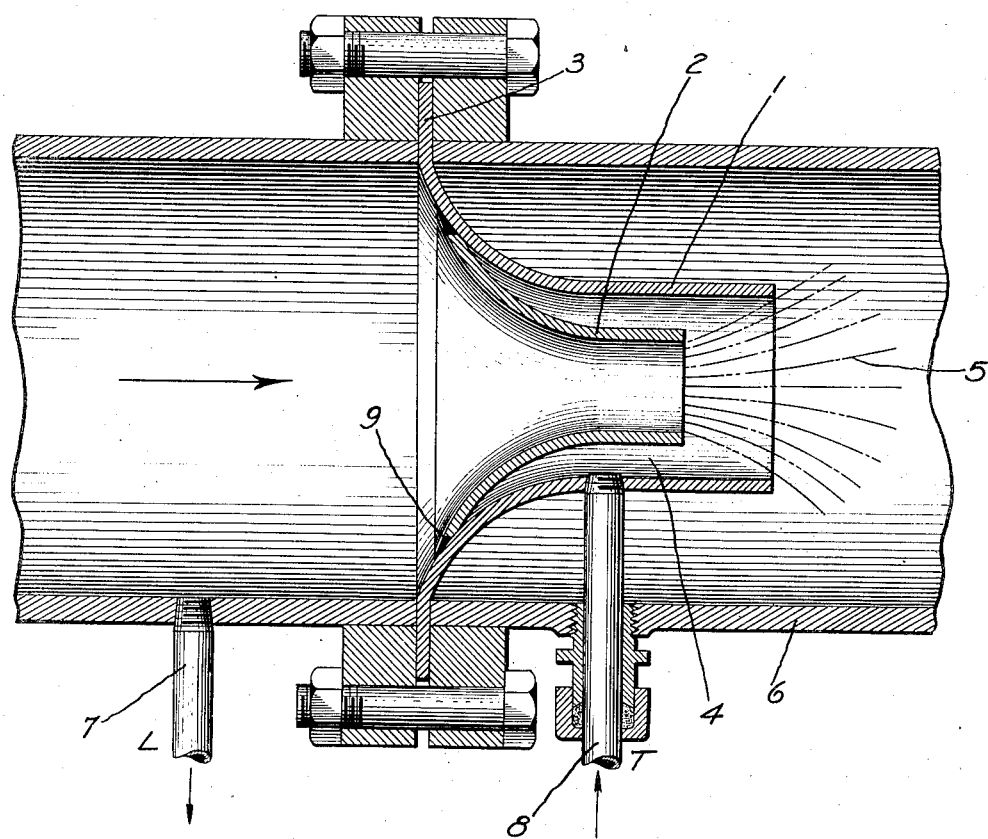
Inventor:
Charles F. Bullock,
by *Alexander S. Lunt*
His Attorney.

Patented Mar. 31, 1925.

1,532,035

UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

FLOW NOZZLE FOR USE WITH FLOW METERS AND THE LIKE.

Application filed August 22, 1923. Serial No. 658,845.

*To all whom it may concern:*

Be it known that I, CHARLES F. BULLOCK, a citizen of the United States, residing at Schenectady, in the county of Schenectady, State of New York, have invented certain new and useful Improvements in Flow Nozzles for Use with Flow Meters and the like, of which the following is a specification.

The present invention relates to flow nozzles such as are used in connection with flow meters for creating a pressure difference which bears a definite relation to the rate of flow. Such flow nozzles are inserted in the conduit through which the fluid to be metered flows with the nozzle pointing down stream, the flange of the flow nozzle being clamped usually between adjacent pipe sections. The leading pressure is taken off in advance of the flange and the trailing pressure is taken off in the space between the flange and the down stream end of the nozzle. Such a flow nozzle arrangement is described in the patent to Dodge, 1,298,471, patented March 25, 1919.

As is well understood, the fluid to be metered in flowing through a flow nozzle has a certain proportion of its pressure converted into velocity and the trailing pressure pipe is connected to the conduit through which the fluid to be metered flows at a point such that it carries to the pressure responsive device of the flow meter, the lower pressure which exists on the down stream side of the flow nozzle.

In order to meter accurately the flow of fluid through a conduit there must be a reasonable amount of difference in pressure on the two sides of the flow nozzle and in cases where the velocity of flow is low, the diameter of the flow nozzle required to give the desired difference in pressure becomes quite small, as compared to the internal diameter of the conduit in which it is located thereby leaving such a large annular space between the inner surface of the conduit and the outer surface of the flow nozzle that the end of the trailing pressure pipe in being connected to the conduit is so far from the nozzle that the accuracy of the meter may be adversely affected.

The object of my invention is to provide an improved flow nozzle which will overcome the above-referred to difficulty and for a consideration of what I believe to be novel and my invention, attention is directed to the accompanying description and the claims appended thereto.

In the drawing, the figure is a longitudinal sectional view of a flow nozzle embodying my invention, the same being shown mounted in a conduit through which the fluid to be metered flows.

According to my invention, I provide a flow nozzle comprising two concentric tubes 1 and 2 both carried by a flange 3. The outer tube 1 is longer than inner tube 2 so that it projects beyond the end of the inner tube 2 a suitable amount. The tubes 1 and 2 merge into each other at their admission ends so as to define between them an annular chamber 4 which is closed at the up stream end and open at the down stream end. The fluid stream upon leaving tube 2 expands or spreads outwardly to again fill the conduit through which the fluid is flowing, the stream taking a curved or cone-shaped form as indicated by the lines 5 and preferably tube 1 is made enough longer than tube 2 that its down stream edge just touches the flowing stream. By this arrangement I then get the same effect as would be obtained if a flow nozzle of the size of tube 2 were installed in a conduit of the size of tube 1. I then connect the trailing pressure pipe to outer tube 1 so it communicates with chamber 4 at a point in advance of the end of inner tube 2. In the drawing, 6 indicates the conduit through which the fluid to be metered flows, 7 indicates the leading pressure pipe, and 8 the trailing pressure pipe. The leading pressure pipe 7 is connected to conduit 6 in advance of the flow nozzle as regards the direction of flow of fluid through conduit 6 and the trailing pressure pipe 8 is connected to chamber 4 at a point in advance of the discharge end of inner tube 2. Tubes 1 and 2 may be connected together in any suitable manner. In the present instance they are shown as being welded together as indicated at 9. It will be understood that pressure pipes 7 and 8 connect with the flow meter proper in the usual and well understood manner.

By my invention I am enabled to meter accurately flow of fluid in conduits in cases where the velocity of flow is comparatively low with the same type of flow meter as is used for high velocity flows, it being only necessary to use in connection with the metering apparatus a flow nozzle embodying my invention.

In accordance with the claims of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A flow nozzle comprising two spaced concentric tubes having curved admission ends which merge into each other, the discharge end of the outer tube projecting a definite distance beyond the end of the discharge end of the inner tube.

2. A flow nozzle comprising a flange from which extends two spaced concentric tubes, the space between said tubes being closed at one end and open at the other, and said outer tube projecting a definite distance beyond the end of the inner tube.

3. The combination with a conduit through which a fluid to be metered flows, of a pressure difference creating device therein comprising a flange and two spaced, concentric tubes projecting down stream from the flange, the outer of said tubes projecting a definite distance beyond the end of the inner of said tubes, a leading pressure pipe connected to the conduit in advance of the flange as regards the flow of fluid through the conduit, and a trailing pressure pipe communicating with the space between said concentric tubes.

In witness whereof, I have hereunto set my hand this 21st day of August, 1923.

CHARLES F. BULLOCK.